United States Patent
Arnault et al.

(10) Patent No.: US 11,092,227 B2
(45) Date of Patent: Aug. 17, 2021

(54) PULLEY DEVICE FOR A TENSIONER ROLLER OR WINDING ROLLER

(71) Applicant: Aktiebolaget SKF, Gothenburg (SE)

(72) Inventors: Benoit Arnault, Saint-Cyr-sur-Loire (FR); Nicolas Tronquoy, Fondettes (FR); Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 304 days.

(21) Appl. No.: 16/423,378

(22) Filed: May 28, 2019

(65) Prior Publication Data

US 2019/0390756 A1  Dec. 26, 2019

(30) Foreign Application Priority Data

Jun. 26, 2018  (FR) ..................................... 1855691

(51) Int. Cl.
- *F16H 55/46* (2006.01)
- *F16C 19/06* (2006.01)
- *F16H 57/00* (2012.01)

(52) U.S. Cl.
CPC ............. *F16H 55/46* (2013.01); *F16C 19/06* (2013.01); *F16H 57/0031* (2013.01); *F16C 2361/63* (2013.01)

(58) Field of Classification Search
CPC ................ F16C 13/006; F16C 2361/63; F16H 2007/0865; F16H 55/36; F16H 7/20
USPC ......................................... 474/198, 199, 166
See application file for complete search history.

(56) References Cited

U.S. PATENT DOCUMENTS

| | | | | |
|---|---|---|---|---|
| 622,214 A | * | 4/1899 | Fletcher | B60L 5/06 191/63 |
| 1,177,046 A | * | 3/1916 | Nice | F16C 13/006 384/547 |
| 1,606,175 A | * | 11/1926 | Olinger | F16H 55/50 474/183 |
| 1,627,558 A | * | 5/1927 | Grunwald | F16C 13/006 384/547 |
| 1,976,025 A | * | 10/1934 | Knudsen | F16H 55/44 474/168 |
| 1,995,907 A | * | 3/1935 | Stoll | F16H 55/44 474/168 |
| 2,610,514 A | * | 9/1952 | Long, Jr. | B65H 57/14 474/183 |

(Continued)

FOREIGN PATENT DOCUMENTS

CN  102235430 A  11/2011
EP  1162379 A2  12/2001

*Primary Examiner* — Henry Y Liu
(74) *Attorney, Agent, or Firm* — Garcia-Zamor Intellectual Property Law; Ruy Garcia-Zamor; Bryan Peckjian

(57) ABSTRACT

A pulley device for a tensioner roller or winding roller for a transmission element, providing a bearing and a pulley. The pulley including two pulley elements that are C-shaped in axial section. At least one of the pulley elements has an axial through-opening, the other pulley element providing an axially protruding portion housed in the opening, a collar being formed by deformation of the protruding portion in order to provide axial retention with the opening. The at least one through-opening is provided at its periphery with at least one recessed zone formed in a substantially radially set-back manner with respect to the protrusion, which passes through the opening.

8 Claims, 2 Drawing Sheets

(56) References Cited

U.S. PATENT DOCUMENTS

| | | | | |
|---|---|---|---|---|
| 2,655,813 A * | 10/1953 | Howell | F16H 55/36 | 474/183 |
| 2,922,310 A * | 1/1960 | Anderson | F16H 55/36 | 474/175 |
| 2,923,166 A * | 2/1960 | Brindley | F16H 55/171 | 474/152 |
| 3,490,285 A * | 1/1970 | Donath | F16H 7/12 | 474/187 |
| 3,565,490 A * | 2/1971 | Statz | B60C 7/24 | 301/64.303 |
| 3,592,511 A * | 7/1971 | Hudelson | B62D 55/0966 | 301/64.302 |
| 3,722,968 A * | 3/1973 | Bomberger | F16C 13/006 | 384/492 |
| 3,772,928 A * | 11/1973 | Gobeille | F16H 55/48 | 474/170 |
| 3,789,683 A * | 2/1974 | Frost | F16H 55/44 | 474/181 |
| 3,815,959 A * | 6/1974 | Hill | B60B 27/0005 | 301/5.306 |
| 3,822,457 A * | 7/1974 | Frost | F16H 55/44 | 29/892.11 |
| 3,898,888 A * | 8/1975 | Frost | F16H 55/44 | 474/181 |
| 3,961,406 A * | 6/1976 | Frost | B21D 53/261 | 29/892.11 |
| 4,025,132 A * | 5/1977 | Watanabe | F16C 13/006 | 384/130 |
| 4,113,328 A * | 9/1978 | Vander Meulen | B65G 39/09 | 384/482 |
| 4,254,541 A * | 3/1981 | St. John | B23P 11/00 | 192/107 T |
| 4,265,133 A * | 5/1981 | Van Der Meulen | F16H 15/10 | 474/171 |
| 4,294,491 A * | 10/1981 | Black | B60B 3/082 | 301/105.1 |
| 4,402,678 A * | 9/1983 | St. John | B23P 11/00 | 474/171 |
| 4,441,692 A * | 4/1984 | Kovaleski | B66D 3/08 | 254/390 |
| 4,443,210 A * | 4/1984 | Olschewski | F16H 7/1281 | 474/112 |
| 4,464,949 A * | 8/1984 | Concina | F16H 55/06 | 474/152 |
| 4,474,562 A * | 10/1984 | Heurich | F16H 7/1281 | 29/517 |
| 4,504,252 A * | 3/1985 | Honma | F16C 13/006 | 474/112 |
| 4,511,192 A * | 4/1985 | Hans | F16C 13/006 | 384/543 |
| 4,518,372 A * | 5/1985 | Dye | F16C 13/006 | 474/199 |
| 4,534,749 A * | 8/1985 | Hans | F16C 13/006 | 474/174 |
| 4,580,846 A * | 4/1986 | Johnson | B60B 3/002 | 301/64.303 |
| 4,602,875 A * | 7/1986 | Doerr | F16H 55/48 | 384/547 |
| 4,610,646 A * | 9/1986 | Walter | F16C 13/006 | 474/174 |
| 4,792,243 A * | 12/1988 | Takeuchi | F16C 33/6618 | 384/486 |
| 4,810,108 A * | 3/1989 | Yajima | F16C 13/006 | 384/488 |
| 4,863,293 A * | 9/1989 | Sytsma | F16C 13/006 | 384/482 |
| 5,188,573 A * | 2/1993 | Leicht | B21D 53/261 | 474/175 |
| 5,630,769 A * | 5/1997 | Schmidt | B60B 5/02 | 474/167 |
| 5,725,448 A * | 3/1998 | Kato | F16C 13/006 | 384/510 |
| 5,775,819 A * | 7/1998 | Kinney | F16C 13/006 | 384/449 |
| 6,220,982 B1 * | 4/2001 | Kawashima | F16H 55/44 | 474/199 |
| 6,241,257 B1 * | 6/2001 | Hauck | F16C 13/006 | 277/637 |
| 6,270,001 B1 * | 8/2001 | Tadic | B23K 31/02 | 228/245 |
| 6,357,926 B1 * | 3/2002 | Hauck | F16C 13/006 | 384/546 |
| 6,854,893 B2 * | 2/2005 | Schmidt | F16C 13/006 | 384/477 |
| 6,941,651 B2 * | 9/2005 | Radocaj | B21K 1/42 | 29/509 |
| 7,011,593 B2 * | 3/2006 | Schenk | F16C 33/723 | 474/199 |
| 7,485,059 B2 * | 2/2009 | Fadler | F16H 55/44 | 474/166 |
| 7,591,593 B2 * | 9/2009 | Tsujimoto | F16C 33/7896 | 384/486 |
| 7,695,385 B2 * | 4/2010 | Barraud | F16C 35/07 | 474/199 |
| 8,012,053 B2 * | 9/2011 | Filip | F16C 13/006 | 474/144 |
| 8,172,056 B2 * | 5/2012 | Barraud | F16D 41/069 | 192/45.1 |
| 8,235,851 B2 * | 8/2012 | Eidloth | F16C 33/6607 | 474/199 |
| 9,086,139 B2 * | 7/2015 | Varnoux | F16C 35/063 | |
| 9,416,863 B2 * | 8/2016 | Schaefer | F16H 55/48 | |
| 9,452,580 B2 * | 9/2016 | Swane | F16H 55/48 | |
| 9,464,700 B2 * | 10/2016 | Hedman | F16C 33/586 | |
| 9,506,538 B2 * | 11/2016 | Hedman | F16H 7/20 | |
| 10,030,758 B2 * | 7/2018 | Basile | F16C 35/067 | |
| 10,088,031 B2 * | 10/2018 | Koda | F16H 55/44 | |
| 10,228,051 B2 * | 3/2019 | Basile | F16H 55/566 | |
| 2004/0097313 A1 * | 5/2004 | Singer | F16C 41/04 | 474/199 |
| 2004/0235599 A1 * | 11/2004 | Ozorak | F16C 25/08 | 474/199 |
| 2005/0026729 A1 * | 2/2005 | Schenk | F16C 33/7896 | 474/101 |
| 2006/0142102 A1 * | 6/2006 | Radocaj | F16H 55/36 | 474/199 |
| 2006/0153484 A1 * | 7/2006 | Ohata | F16C 33/7823 | 384/484 |
| 2006/0171622 A1 * | 8/2006 | Ohata | F04B 27/1063 | 384/513 |
| 2007/0072714 A1 * | 3/2007 | Filip | F16C 33/723 | 474/144 |
| 2007/0242909 A1 * | 10/2007 | Fournier | F16C 29/045 | 384/132 |
| 2008/0132365 A1 * | 6/2008 | Boussaguet | F16H 7/20 | 474/136 |
| 2008/0230341 A1 * | 9/2008 | Barraud | F16D 41/069 | 192/41 A |
| 2008/0287236 A1 * | 11/2008 | Yamaguchi | F16H 55/36 | 474/170 |
| 2009/0098967 A1 * | 4/2009 | Eidloth | F16C 19/26 | 474/199 |
| 2009/0226124 A1 * | 9/2009 | Nakagawa | F16C 33/7859 | 384/478 |
| 2009/0298630 A1 * | 12/2009 | Mineno | F16C 35/063 | 474/199 |
| 2011/0009220 A1 * | 1/2011 | Arnault | F16C 35/073 | 474/166 |
| 2012/0028745 A1 * | 2/2012 | Mola | F16C 13/006 | 474/166 |
| 2012/0142468 A1 * | 6/2012 | Lescorail | F16C 43/04 | 474/136 |
| 2012/0142470 A1 * | 6/2012 | Varnnoux | F16C 19/163 | 474/199 |
| 2013/0225344 A1 * | 8/2013 | Arnault | F16H 55/36 | 474/166 |
| 2013/0331215 A1 * | 12/2013 | Hewitt | F16H 55/44 | 474/174 |

(56) References Cited

U.S. PATENT DOCUMENTS

| | | | |
|---|---|---|---|
| 2013/0337952 A1* | 12/2013 | Berruet | F16F 15/1245 |
| | | | 474/94 |
| 2013/0337953 A1* | 12/2013 | Berruet | F16D 3/68 |
| | | | 474/94 |
| 2014/0364258 A1* | 12/2014 | Lescorail | F01P 5/12 |
| | | | 474/150 |
| 2015/0141185 A1* | 5/2015 | Albrecht | F16H 55/36 |
| | | | 474/199 |
| 2015/0267791 A1* | 9/2015 | Hedman | F16C 13/006 |
| | | | 474/199 |
| 2015/0292603 A1* | 10/2015 | Cherioux | F16H 7/20 |
| | | | 474/166 |
| 2015/0300463 A1* | 10/2015 | Albrecht | F16H 7/20 |
| | | | 474/166 |
| 2016/0327146 A1* | 11/2016 | Lescorail | F16H 55/36 |
| 2017/0292599 A1* | 10/2017 | Basile | F16H 55/36 |

* cited by examiner

PULLEY DEVICE FOR A TENSIONER ROLLER OR WINDING ROLLER

CROSS-REFERENCE

This application claims priority to French patent application no. 1855691 filed on Jun. 26, 2018, the contents of which are fully incorporated herein by reference.

TECHNOLOGICAL FIELD

The present invention relates to the field of pulley devices for tensioner rollers or winding rollers that are intended to cooperate with a transmission element, for example a timing belt or chain or a drive belt or chain of a motor vehicle internal combustion engine.

BACKGROUND

Such rollers serve generally to permanently maintain tension in the transmission element in a given range or to locally modify the path taken thereby. The rollers are thus referred to as tensioner rollers and winding rollers, respectively. In winding rollers, the pulley is rotatably mounted on a threaded screw body via a bearing, the roller then being fixed directly or indirectly to the engine block or to an element of a tensioner roller device, for example an articulated arm or an eccentric.

The bearing generally comprises a fixed inner ring having a bore through which the screw passes, a rotating outer ring surmounted by the pulley, and at least one row of rolling elements interposed between the rings.

It is particularly known to provide a pulley having two pulley elements that are each C-shaped in axial section, the two elements each being mounted symmetrically on an outer surface of the outer ring of the bearing. Generally, these two pulley elements are mounted tightly on the outer ring, but it is known to provide specific axial attachment means between the two elements.

For example, in the prior publications U.S. Pat. No. 1,177,046 and U.S. Pat. No. 4,518,372, the radial portions of the two C-shaped pulley elements are provided circumferentially with a set of through-holes, the holes of the sets being axially opposite one another. The two elements are attached via rivets provided in the openings. However, such a pulley requires a plurality of rivets in order to secure the two C-shaped pulley elements. This involves additional parts on a production and assembly line, specific stock management, and additional costs.

It is also known from U.S. Pat. No. 1,627,558 to provide each of the C-shaped pulley elements circumferentially with a set of through-holes, the holes of the sets being angularly offset. The radial portion of one pulley part comprises an axial protrusion inserted into a corresponding through-hole in the other pulley element, the protrusion then being deformed to provide axial retention. However, the method of deforming the protrusions causes weakness in each pulley element, more particularly at the peripheries of the openings and the joint zones between the axial portions and the radial portion of each C-shaped element. When the protrusions of a first pulley element, housed in the through-openings of a second pulley element, are deformed against the intermediate portion of the second pulley element, forces are necessarily transmitted to the peripheral borders of the openings. This border, and consequently the intermediate portion, can also be deformed. This can result in overall deformation of the pulley element and thus incorrect mounting on the outer ring of the bearing.

SUMMARY

The present invention aims to remedy these drawbacks.

More particularly, the present invention aims to provide a pulley device that is particularly economical, is easy and safe to mount, forming a subassembly that is incapable of being dismantled, and has a smaller axial and radial space requirement.

The invention relates to a pulley device for a tensioner roller or winding roller for a transmission element, having a central axis and comprising a pulley and a bearing.

The bearing is provided with a rotating outer ring, with a fixed inner ring with a bore that can take a body of a screw, and with at least one row of rolling elements arranged between the rings.

The pulley is provided with two pulley elements that are C-shaped in axial section and each have an inner portion mounted on an outer surface of the outer ring of the bearing, an outer portion with an outer surface intended to cooperate with the transmission element, and an intermediate portion extending substantially radially between axial ends of the inner portion and outer portion along an axial side, the intermediate portions of the two pulley elements bearing axially against one another, and each pulley element being formed in one piece.

The intermediate portion of at least one of the pulley elements comprises at least one axial through-opening, the intermediate portion of the other pulley element comprising an axially protruding portion housed in the opening, a collar being formed by deformation of a free axial end of the protruding portion that is directed in a substantially radial direction in order to provide axial retention with the peripheral border of the opening.

According to the invention, the at least one through-opening is provided at its periphery with at least one recessed zone formed in a substantially radially set-back manner with respect to the protrusion which passes through the opening.

By virtue of the invention, such an opening comprises a recessed zone that is set back with respect to the protrusion in order to protect the intermediate portion of the pulley element from forces and any deformations in this zone during the production of the collar by deformation of the free axial end of the protruding portion.

In addition, as a result of this set-back recessed zone being directed in a substantially radial direction, the folded joint between the intermediate portion and an inner portion and/or outer portion is also subjected less to forces and any deformations.

This results in pulley elements that are joined axially together to form a unit pulley assembly. These pulley elements are easy and economical to manufacture since they require manufacturing methods and tooling that are known and economical, without requiring additional fastening elements. Once assembled, these pulley elements do not have weak zones and present a lower risk of breaking in operation. These pulley elements have a controlled size even once assembled and are mounted optimally on the outer ring of the bearing.

According to further advantageous but non-essential features of the invention, taken on their own or in combination:

The at least one through-opening is provided at its periphery with two recessed zones formed in a radially set-back manner in opposite directions with respect to the protruding portion which passes through the opening.

The protruding portion is tubular.

The intermediate portions of each of the two pulley elements circumferentially comprise a set of through-openings and a set of portions protruding axially in the direction of the other pulley element.

The openings and the protruding portions of one and the same pulley element alternate with one another.

The outer portions of the pulley elements are cylindrical.

The inner portions of the pulley elements are cylindrical.

The inner portions of the pulley elements are mounted tightly on an outer surface of the outer ring of the bearing.

At least one pulley element is provided with a lateral portion extending substantially radially from an axial end of the inner portion axially on the opposite side from the intermediate portion, the lateral portion coming to bear axially against a lateral surface of the outer ring of the bearing.

The inner ring of the bearing comprises at least one end portion protruding axially with respect to a lateral surface of the outer ring, the lateral portion of a pulley element having a free end that passes into the immediate vicinity of an outer surface of the axially protruding end portion of the inner ring to form a narrow passage.

The end portion of the inner ring protrudes axially with respect to the lateral portion of the pulley element.

The pulley device comprises retaining means that are intended to cooperate with the screw.

The bore of the fixed inner ring comprises an inner circumferential groove in which an annular O-ring cooperating with the screw is housed.

A cage maintains the circumferential spacing of the rolling elements.

The rolling elements are balls.

The pulley elements are made of metal, for example of steel.

BRIEF DESCRIPTION OF THE DRAWINGS

The present invention will be understood better from reading the detailed description of an embodiment of the invention, which is given by way of entirely non-limiting example and is illustrated in the appended drawings, in which.

DETAILED DESCRIPTION

Figure 1:
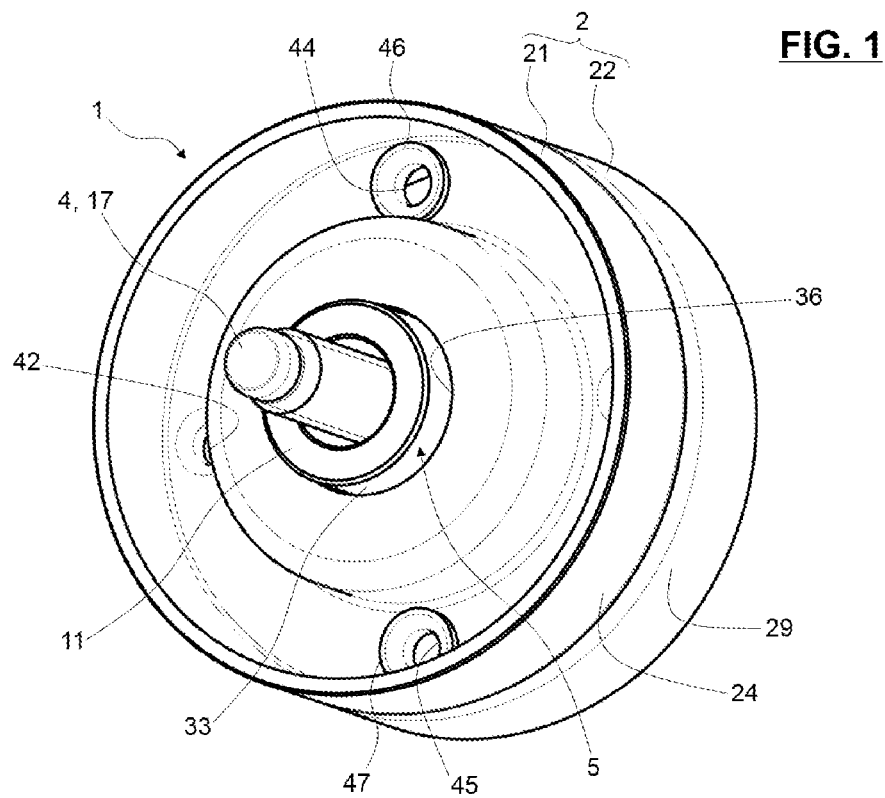
FIG. 1 is a perspective rear view of a pulley device.
Figure 2:
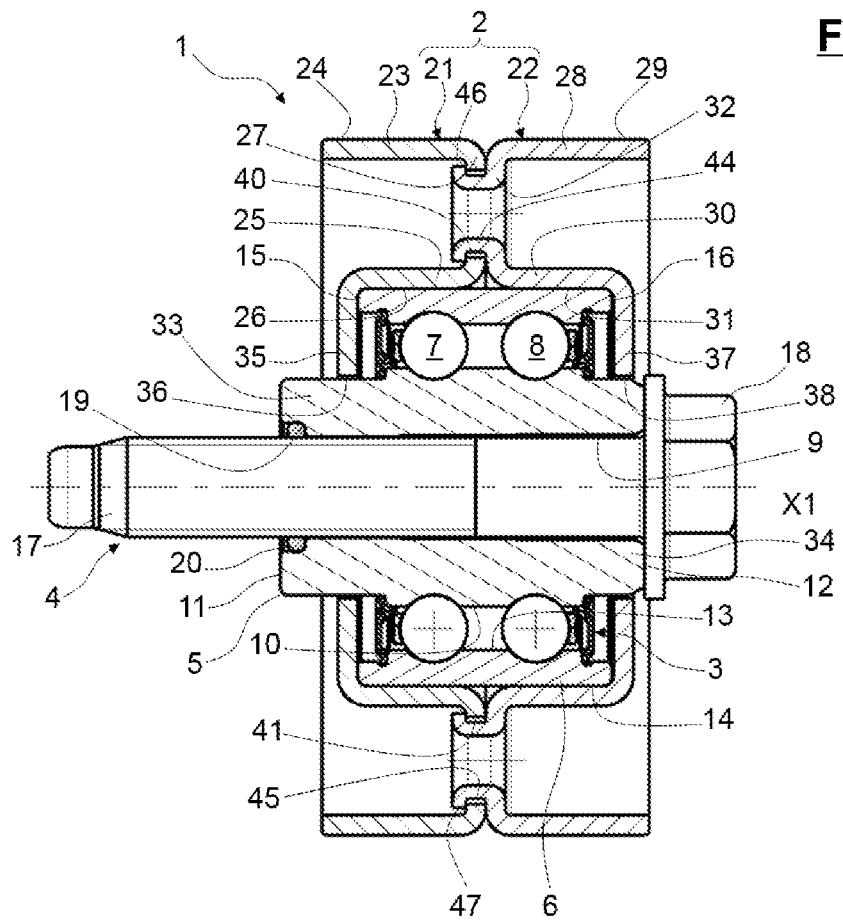
FIG. 2 is a view in axial section of the pulley device in FIG. 1.

As can be seen in FIGS. 1 and 2, a pulley device for a tensioner roller or winding roller of a belt, bearing the overall reference 1, has a geometric axis X1 and comprises a pulley 2 designed to cooperate with a transmission element (not shown) such as a belt or a chain, a bearing 3, and a screw 4.

The bearing 3 comprises a fixed inner ring 5, a rotating outer ring 6, the rings 5, 6 being coaxial about the axis X1. The bearing 3 also comprises two rows of rolling elements 7 and 8, in the form of balls here, that are disposed in a radial space formed between the rings, and cages (not referenced) that maintain the circumferential spacing of the rolling elements 7 and 8, respectively.

The inner ring 5 and outer ring 6 are concentric. In the exemplary embodiment illustrated, the rings are solid, that is to say obtained by machining or grinding with removal of material from metal tubes, bars, forged parts or rolled blanks.

The inner ring 5 comprises a bore 9, a stepped outer surface 10 provided with raceways (not referenced) that have, in axial section, a concave and toroidal internal profile suitable for the rolling elements 7, 8, and a rear lateral surface 11 and a forward lateral surface 12.

The outer ring 6 comprises a stepped cylindrical bore 13 provided with raceways (not referenced) that have, in axial section, a concave and toroidal internal profile suitable for the rolling elements 7, 8, an outer cylindrical surface 14 on which the pulley 2 is mounted, and a rear lateral surface 15 and a forward lateral surface 16.

The fixed inner ring 5 extends axially out of the rotating outer ring 6 in a rearward axial direction towards a support (not shown) on which the pulley device 1 is intended to be mounted. The fixed inner ring 5 is thus provided with a rearwardly protruding axial end portion 33, the rear lateral surface 11 of which is offset axially with respect to the rear lateral surface 15 of the outer ring 6. The rear lateral surface 11 is intended to form a bearing surface for the bearing 3 against the support for the device 1.

The fixed inner ring 5 also extends axially out of the rotating outer ring 6 in a forward axial direction away from the support on which the pulley device 1 is intended to be mounted. The fixed inner ring 5 is thus provided with a forwardly protruding axial end portion 34, the forward lateral surface 12 of which is offset axially with respect to the forward lateral surface 16 of the outer ring 6. The forward lateral surface 12 is intended to form a bearing surface for the screw 4.

The bearing 3 advantageously comprises, on each axial side, an annular seal (not referenced) for closing the radial space between the rings 5, 6 and inside which the rolling elements 7, 8 are housed.

Alternatively, the bearing may comprise a different number of rows of rolling elements arranged between the outer and inner rings, for example a single row of rolling elements.

Alternatively, the bearing may comprise other types of rolling elements, for example tapered rollers or needles. Alternatively, the bearing may be a plain bearing.

In this embodiment, the inner ring 5 is formed in one piece. According to an alternative embodiment that is not shown, the bearing 3 may comprise an annular spacer mounted in the inner ring 5.

The screw 4 comprises a body 17 and a head 18 at one axial end of the body 17. The body 17 is housed in the bore 9 of the bearing 3 and extends axially beyond the rear lateral surface 11 of the fixed inner ring 6. The body 17 comprises a threaded portion intended to be screwed into a corresponding tapped opening in the support for the pulley device 1. The head 18 of the screw 4 has a relatively flat surface that comes to bear against the forward lateral surface 12 of the inner ring 5 of the bearing 3, on the axially opposite side from the support into which the body 17 is intended to be screwed.

In the embodiment illustrated, the bore 9 of the inner ring 3 is provided with a circumferential groove 19 at its rear end. An annular O-ring 20, preferably elastic, is housed in the groove 19 and cooperates with the body 17 of the screw 4 in order to keep the screw 4 secured to the inner ring 5, and thus to the pulley device 1.

The pulley 2 comprises a rear pulley element 21 and a forward pulley element 22.

The rear pulley element 21 comprises an outer annular portion 23 with an outer cylindrical surface 24 that is able to cooperate with a transmission means, and a cylindrical bore (not referenced). The element 21 also comprises an inner annular portion 25 with a cylindrical bore 26 mounted tightly on the outer cylindrical surface 14 of the rotating outer ring 6 of the bearing 3, and an outer cylindrical surface (not referenced). The outer annular portion 23 is tubular and has a larger diameter than the inner annular portion 25, which is likewise tubular, the outer annular portion 23 radially surrounding the inner annular portion 25. The outer annular portion 23 likewise has an axial dimension greater than the inner annular portion 25, the outer annular portion 23 protruding axially with respect to the inner annular portion 25 on the rear axial side of the device 1.

Finally, the rear pulley element 21 comprises an intermediate portion 27 connecting the inner annular portion 25 and outer annular portion 23. The intermediate portion 27 extends radially between the forward axial ends of the inner portion 25 and outer portion 23 of the rear pulley element 21.

The rear pulley element 21 is provided with a rear lateral portion 35. The rear lateral portion 35 extends substantially radially from an axial end of the inner portion 25 axially on the opposite side from the intermediate portion 27 of the rear pulley element 21. The rear lateral portion 35 comes to bear axially against the rear lateral surface 15 of the outer ring 6 of the bearing 3. The rear lateral portion 35 is provided with a free end, which passes into the immediate vicinity of an outer surface of the rearwardly axially protruding end portion 33 of the inner ring 5 to form a radial narrow passage 36.

The rear pulley element 21 has the overall shape of a C in axial section, defining an annular opening that is open on the rear axial side of the device 1 in the direction of the support on which the device 1 is intended to be mounted.

The forward pulley element 22 comprises an outer annular portion 28 with an outer cylindrical surface 29 that is able to cooperate with a transmission means, and a cylindrical bore (not referenced). The element 22 also comprises an inner annular portion 30 with a cylindrical bore 31 mounted tightly on the outer cylindrical surface 14 of the rotating outer ring 6 of the bearing 3, and an outer cylindrical surface (not referenced). The outer annular portion 28 is tubular and has a larger diameter than the inner annular portion 30, which is likewise tubular, the outer annular portion 28 radially surrounding the inner annular portion 30. The outer annular portion 28 likewise has an axial dimension greater than the inner annular portion 30, the outer annular portion 28 protruding axially with respect to the inner annular portion 30 on the forward axial side of the device 1.

Finally, the forward pulley element 22 comprises an intermediate portion 32 connecting the inner annular portion 30 and outer annular portion 28. The intermediate portion 32 extends radially between the rear axial ends of the inner portion 30 and outer portion 28 of the forward pulley element 22.

Axially on the opposite side from the rear lateral portion 35, the forward pulley element 22 is provided with a forward lateral portion 37. The forward lateral portion 37 extends substantially radially from an axial end of the inner portion 30 axially on the opposite side from the intermediate portion 32 of the forward pulley element 22. The forward lateral portion 37 comes to bear axially against the forward lateral surface 16 of the outer ring 6 of the bearing 3. The forward lateral portion 37 is provided with a free end, which passes into the immediate vicinity of an outer surface of the forwardly axially protruding end portion 34 of the inner ring 5 to form a radial narrow passage 38.

The forward pulley element 22 has the overall shape of a C in axial section, defining an annular opening that is open on the forward axial side of the device 1 in the direction away from the support on which the device 1 is intended to be mounted.

The forward pulley element 21 and rear pulley element 22 are mounted on the rotating outer ring 6 of the bearing 3 such that their intermediate portions 27 and 32, respectively, come to bear radially against one another. The pulley elements 21, 22 are mounted axially in a symmetric manner. The outer cylindrical surfaces 24, 29 of the outer annular portions 23, 28 of the forward pulley element 21 and rear pulley element 22, respectively, form, in combination, a surface for cooperation with a transmission element.

Particularly advantageously, the forwardly axially protruding end portion 34 of the inner ring 5 protrudes axially with respect to the forward lateral portion 37 of the forward pulley element 22. In addition, the forwardly axially protruding end portion 34 is chamfered to form an additional barrier to the ingress of pollution and water.

Each of the rear pulley element 21 and forward pulley element 22 are advantageously in one piece and are advantageously formed by cutting out and stamping a metal sheet, for example made of steel.

Figure 3:
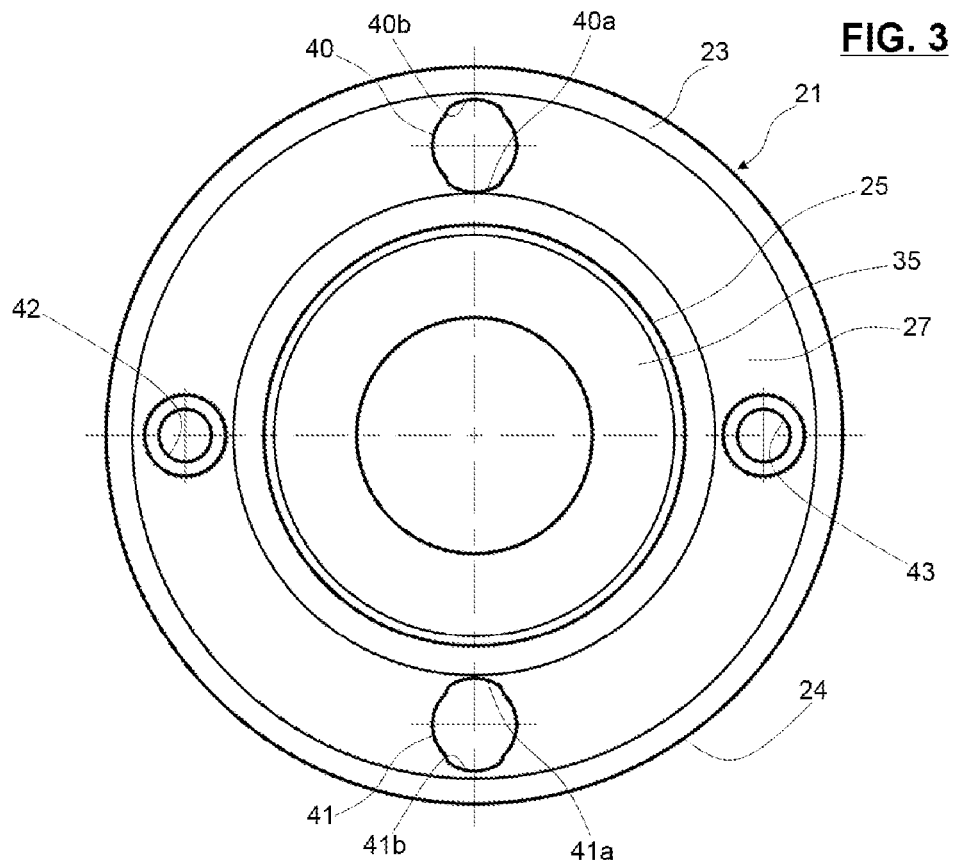
FIGS. 3 and 4 are a front end-on view and a front perspective view of a pulley element for the pulley device in FIG. 1.
Figure 4:
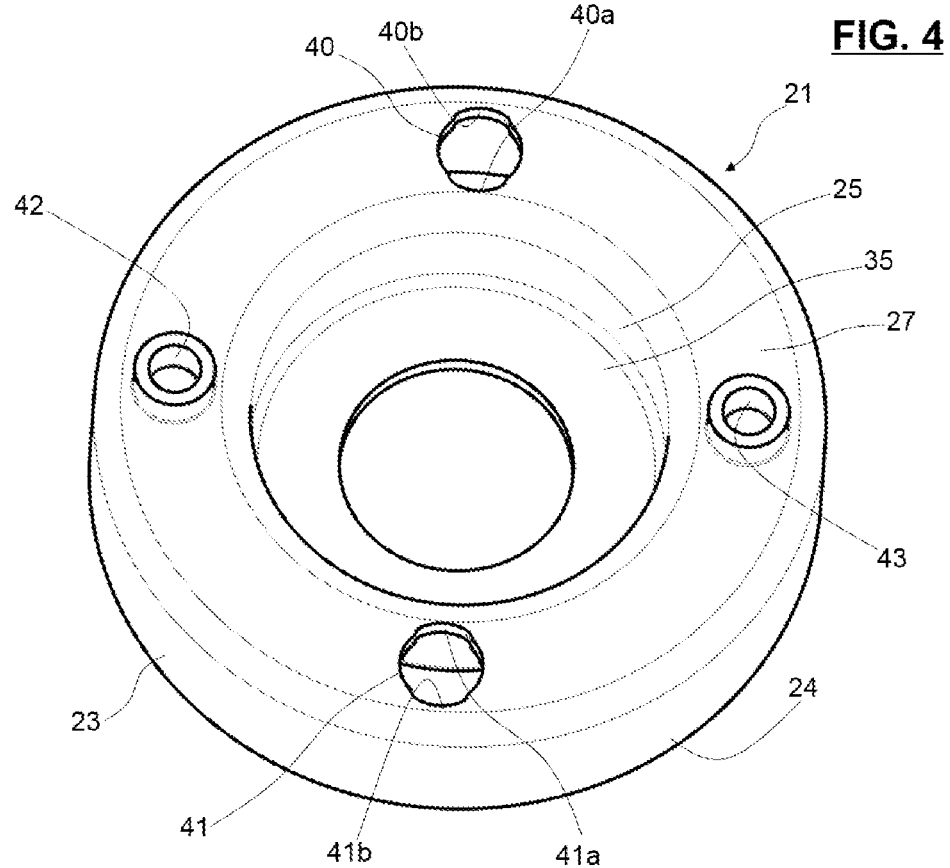

As illustrated in FIGS. 3 and 4, the intermediate portion 27 of the rear pulley element 21 comprises two diametrically opposite through-openings 40, 41, and two likewise diametrically opposite protruding portions 42, 43. The openings and protruding portions alternate circumferentially. The protruding portions 42, 43 are tubular.

Similarly, the intermediate portion 32 of the forward pulley element 22 comprises two diametrically opposite through-openings (not shown), and two likewise diametrically opposite protruding portions 44, 45. The openings and protruding portions alternate circumferentially. The protruding portions 44, 45 are tubular.

The openings 40, 41 in the rear pulley element 21 axially face the protruding portions 44, 45, respectively, of the front pulley element 22. Similarly, the openings in the forward pulley element 22 axially face the protruding portions 42, 43, respectively, of the rear pulley element 21. The protruding portions 42, 43 and 44, 45 are housed in the corresponding through-openings 40, 41.

The protruding portions 44, 45 of the forward pulley element 22 are each provided with an annular collar 46, 47, respectively. The collars 46, 47 are each formed by deformation of a free axial end of the protruding portions 44, 45, respectively. The collars 46, 47 are directed in a substantially radial direction so as each to provide axial retention with the peripheral border of the corresponding opening 40, 41 in the rear pulley element 21. Similarly, the protruding portions 42, 43 of the rear pulley element 21 are each provided with an annular collar (not shown) to provide axial retention with the corresponding opening in the forward pulley element 22.

The pulley elements 21, 22 are thus joined axially together to form a unit pulley assembly 2. In addition, the outer ring 6 of the bearing 3 is axially retained between the rear lateral portion 35 of the rear pulley element 21 and the forward lateral portion 37 of the forward pulley element 22. The pulley 2 is thus retained axially on the outer ring 6 of the bearing 3. In addition, the inner annular portions 25, 30 of the rear pulley element 21 and forward pulley element 22, respectively, are mounted tightly on the outer surface 14 of the outer ring 6 of the bearing 3. The pulley 2 thus rotates as one with the outer ring 6 of the bearing 3.

According to the invention, the through-openings 40, 41 in the rear pulley element 21 are each provided at their periphery with two recessed zones 40a, 40b and 41a, 41b formed in a radially set-back manner in opposite directions with respect to the protruding portion 44, 45 which passes through the opening 40, 41, respectively.

The recessed zones 40a, 41a are directed radially towards the inner portion 25, and more particularly towards the folded joint between the intermediate portion 27 provided with the openings 40, 41 and the inner portion 25. The recessed zones 40b, 41b are directed radially towards the outer portion 23, and more particularly towards the folded joint between the intermediate portion 27 provided with the openings 40, 41 and the outer portion 27.

The borders of the openings 40, 41 are circular with a diameter corresponding to an assembly clearance close to the outside diameters of the tubular protruding portions 42, 43, and the recessed zones illustrated in FIG. 3 are portions of circular arc with a greater diameter that are concentric with the circular borders and joined to the borders. Alternatively, the recessed zones can be any other shape, for example oval.

Advantageously, the through-openings (not shown) in the forward pulley element 22 are likewise provided with similar recessed zones.

By virtue of the invention, such openings 40, 41 with recessed zones 40a, 40b and 41a, 41b make it possible to protect the intermediate portion 27 of the pulley element 21 from forces and any deformations in these zones during the production of the collars 46, 47 by deformation of the free axial end of the protruding portion 44, 45. The folded joints between the intermediate portion 27 and the outer portion 23, for the one part, and between the intermediate portion 27 and the inner portion 25, for the other part, are also subjected less to forces and any deformations. Once assembled, the pulley elements 21, 22 do not have weak zones and present a lower risk of breaking in operation. These pulley elements 21, 22 have a controlled size even once assembled, and are mounted optimally on the outer surface 14 of the outer ring 6 of the bearing 3.

The pulley elements 21, 22, and more particularly such openings 40, 41, are easy and economical to manufacture since they require manufacturing methods and tooling that are known and economical.

All or only some of the technical features of the various embodiments can be combined with one another. Thus, the pulley device can be adapted in terms of cost, performance and ease of use.

What is claimed is:

1. A pulley device for a tensioner roller or winding roller for a transmission element, the pulley device comprising:
    a bearing having:
        a rotating outer ring,
        a fixed inner ring with a bore configured to accept a body of a screw, and
        at least one row of rolling elements arranged between the rings; and
    a pulley providing two pulley elements that are C-shaped in axial section, wherein each of the two pulley elements include:
        an inner portion mounted on the outer surface of the outer ring of the bearing,
        an outer portion with an outer surface intended to cooperate with the transmission element, and
        an intermediate portion extending substantially radially between axial ends of the inner portion and outer portion along an axial side, the intermediate portions of the two pulley elements bearing axially against one another, and each pulley element is formed in one piece, wherein
    the intermediate portion of at least one of the pulley elements comprises at least one axial through-opening, the intermediate portion of the other pulley element comprising an axially protruding portion housed in the opening, a collar being formed by deformation of a free axial end of the protruding portion that is directed in a substantially radial direction in order to provide axial retention with the peripheral border of the opening; and wherein
    the at least one through-opening is provided at its periphery with at least one recessed zone formed in a substantially radially set-back manner with respect to the protrusion which passes through the opening.

2. The pulley device according to claim 1, wherein the at least one through-opening is provided at its periphery with two recessed zones formed in a radially set-back manner in opposite directions with respect to the protruding portion which passes through the opening.

3. The pulley device according to claim 1, wherein the protruding portion is tubular.

4. The pulley device according to claim 1, wherein the intermediate portions of each of the two pulley elements circumferentially comprise a set of through-openings and a set of portions protruding axially in the direction of the other pulley element.

5. The pulley device according to claim 4, wherein the openings and the protruding portions of one and the same pulley element alternate with one another.

6. The pulley device according to claim 1, wherein the inner portions of the pulley elements are mounted tightly on an outer surface of the outer ring of the bearing.

7. The pulley device according to claim 1, wherein at least one pulley element is provided with a lateral portion extending substantially radially from an axial end of the inner portion axially on the opposite side from the intermediate portion, the lateral portion coming to bear axially against a lateral surface of the outer ring of the bearing.

8. The pulley device according to claim 7, wherein the inner ring of the bearing comprises at least one end portion protruding axially with respect to a lateral surface of the outer ring, the lateral portion of a pulley element having a free end that passes into the immediate vicinity of an outer surface of the axially protruding end portion of the inner ring to form a narrow passage.

* * * * *